United States Patent
Tsutsumi et al.

(10) Patent No.: US 6,932,292 B2
(45) Date of Patent: Aug. 23, 2005

(54) FISHING REEL

(75) Inventors: Wataru Tsutsumi, Tokyo (JP); Kazuyuki Matsuda, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 10/669,698

(22) Filed: Sep. 25, 2003

(65) Prior Publication Data
US 2004/0124299 A1 Jul. 1, 2004

(30) Foreign Application Priority Data
Sep. 25, 2002 (JP) .................................. P2002-278296

(51) Int. Cl.$^7$ .......................... A01K 89/15; F16H 55/14
(52) U.S. Cl. ................... 242/263; 242/249; 242/255; 74/443
(58) Field of Search ......................... 242/249, 263, 242/255; 74/443, 409, 440, 411; 464/73, 74, 75, 89, 92, 93

(56) References Cited

U.S. PATENT DOCUMENTS

| | | | |
|---|---|---|---|
| 3,667,317 A | * | 6/1972 | Hillingrathner .............. 74/604 |
| 3,808,906 A | * | 5/1974 | Bowers ....................... 74/443 |
| 4,427,162 A | * | 1/1984 | Noda .......................... 242/241 |
| 6,394,380 B2 | * | 5/2002 | Takikura ..................... 242/279 |

FOREIGN PATENT DOCUMENTS

JP          2001-333671 A      12/2001

* cited by examiner

Primary Examiner—Kathy Matecki
Assistant Examiner—Evan Langdon
(74) Attorney, Agent, or Firm—Sughrue Mion, PLLC

(57) ABSTRACT

The invention is to offer a fishing reel having a power transmission mechanism enabling to remove backlash in a gear row with a simple structure. The fishing reel according to the invention has a power transmission mechanism for transmitting driving force so as to drive a rotor supported to a reel main body owing to rotating operation of a handle rotatably supported to the reel main body, and is characterized in that a driving force transmitting part of the power transmission mechanism is provided with a rotation power transmitting instrument to be effected by friction of an elastic member.

5 Claims, 9 Drawing Sheets

FISHING REEL

BACKGROUND OF THE INVENTION

The present invention relates to a fishing reel.

Usually, a fishing reel employs a power transmission mechanism by meshing gears each other at a transmitting part of rotation driving force from a handle rotatably supported by a reel main body. In such meshing of the mutual gears, that is, in a power transmission mechanism via a row of gears, (1) in a case of performing the power transmission by meshing the mutual gears, if without having parallelism, a partial abrasion is caused, (2) if not exactly adjusting the gear meshing (adjusting backlash), inconveniences occur as generating vibration (rattling) or bad rotation (dull rotation), (3) in a case of using plural gears in combination, backlash amounts among the respective gears are accumulated, and finally rattling becomes larger between an input member (a handle) and an output member (a rotor of the spinning reel, or the rotor such as spools of reels of both axes), and (4) if working the reel for a long period, bad rotation is generated by increasing the amount of the backlash owing to abrasion in the gears, or influences of abrasion powder dusts. These inconveniences exist, and thus, there remains a room for improvement in the existing fishing reel.

As a technique for checking the backlash as mentioned above, such a structure is known, where the gear of the reel main body is laminated with a backlash removing gear which is concurrently biased by a spring in a circumferential direction, and is in mesh with another interlocking gear to remove the backlash (see, for example, Japanese Patent Publication No. 2001-333671). Depending on this structure, since the gear part of the interlocking gear is elastically held between the gear of the reel main body and the backlash removing gear, the backlash as rattling caused by meshing the gears is absorbed, and as a result, there are brought about very excellent effects enabling to prevent occurrence of rattling or abnormal sound generated when an oscillating mechanism turns over.

In the above reel, the backlash removing gears are constituted by two sheets of laminated gears and one of them is biased in the circumferential direction by a spring, and therefore the number of parts becomes large and increases costs. Further, when setting up the backlash removing gears, the two sheets of gears are combined against a spring force so that the setting-up is troublesome, and there are problems of bad workability, for example, a spring member jumps out from a stationary part during setting up.

SUMMARY OF THE INVENTION

The invention has been made on the basis of the above problems, and accordingly it is an object of the invention to provide a fishing reel having a power transmission mechanism capable of removing the backlash in the gear row with a simple structure.

In order to solve the aforesaid object, the invention is characterized by having the following arrangement in which a fishing reel includes:

a reel body;

a handle rotatably supported by the reel body;

a rotor rotatably supported by the reel body;

a power transmitting mechanism including a driving force transmitting part for transmitting driving force generated by rotating the handle to drive the rotor; and a first rotation power transmitting instrument including an elastic member for frictionally transmitting the driving force provided at the drive force transmitting part.

The driving force transmitting part may include the first rotation power transmitting instrument and a second rotation power transmitting instrument including gears for transmitting the driving force.

According to yet another aspect, a fishing reel includes:

a first shaft;

a first gear provided at the first shaft;

a friction transmission rotating part coaxial with the first gear and provided at the first shaft;

a second shaft a second gear in mesh with the first gear provided at the second shaft; and an elastic member coaxial with the second gear and provided at the second shaft, wherein the elastic member elastically contacts with the friction transmission rotating part, and driving force is transmitted between the first and second shafts via the first and second gear and via the friction transmission rotation part and the elastic member.

In addition, the fishing reel may include:

a handle for generating the driving force; and a rotor which is rotated by the driving force, wherein the first and second shafts are interposed between the handle and the rotor for transmitting the driving force.

DETAILED DESCRIPTION OF PREFERRED EMBODIMENTS

First Embodiment

Figure 1:
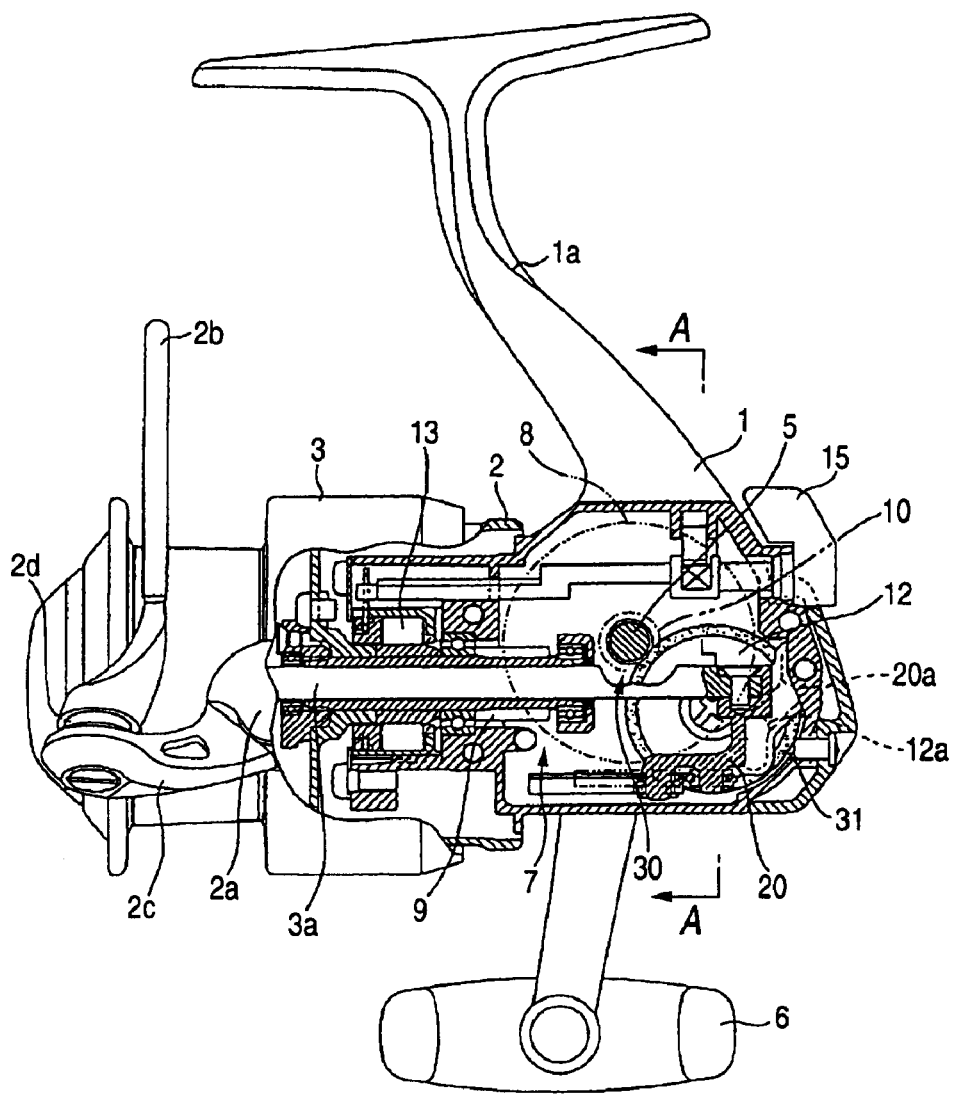
FIG. 1 is a view of a first embodiment of the invention, showing an interior structure of a spinning reel.
Figure 2:
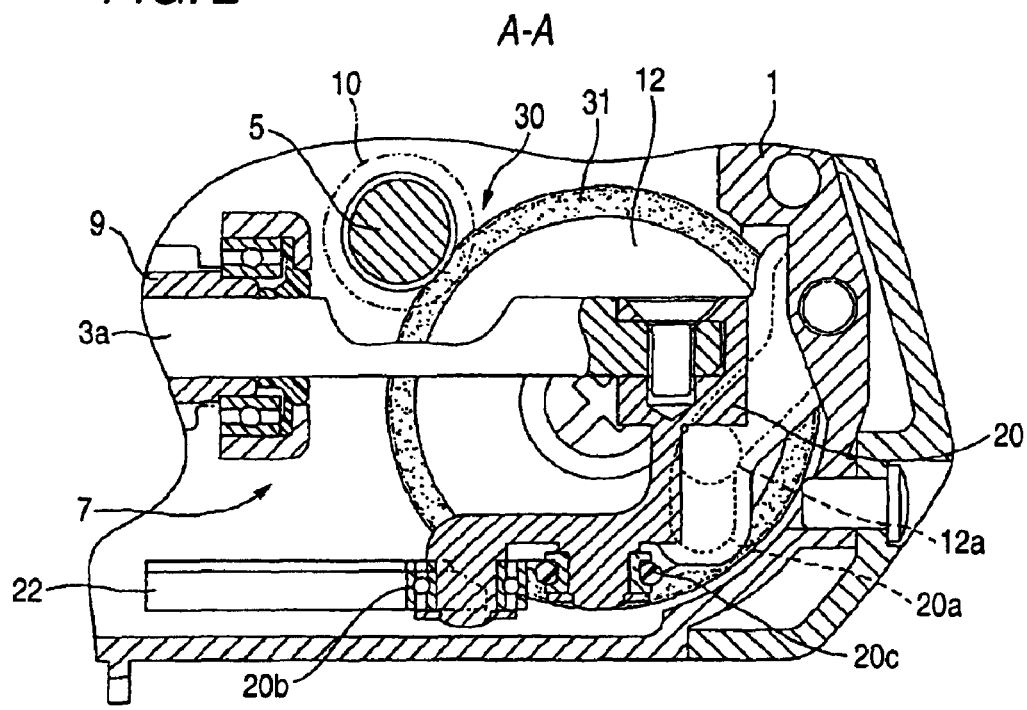
FIG. 2 is an enlarged view of a main part of the spinning reel shown in FIG. 1.
Figure 3:
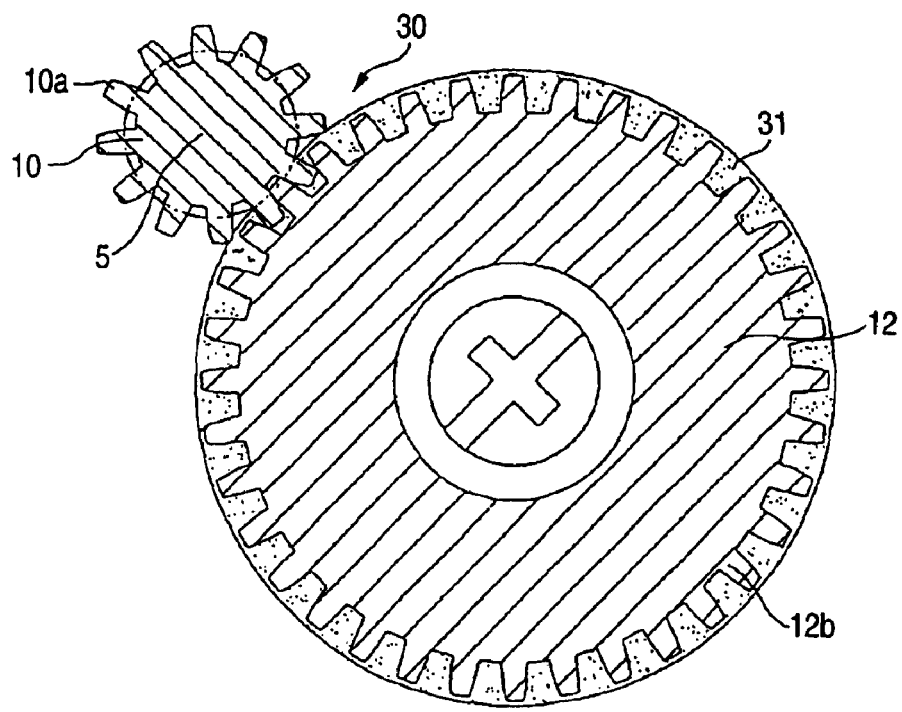
FIG. 3 is a view showing a structure of a driving force transmitting part between a driving shaft attached with a handle and a fishline coiling device.
Figure 4:
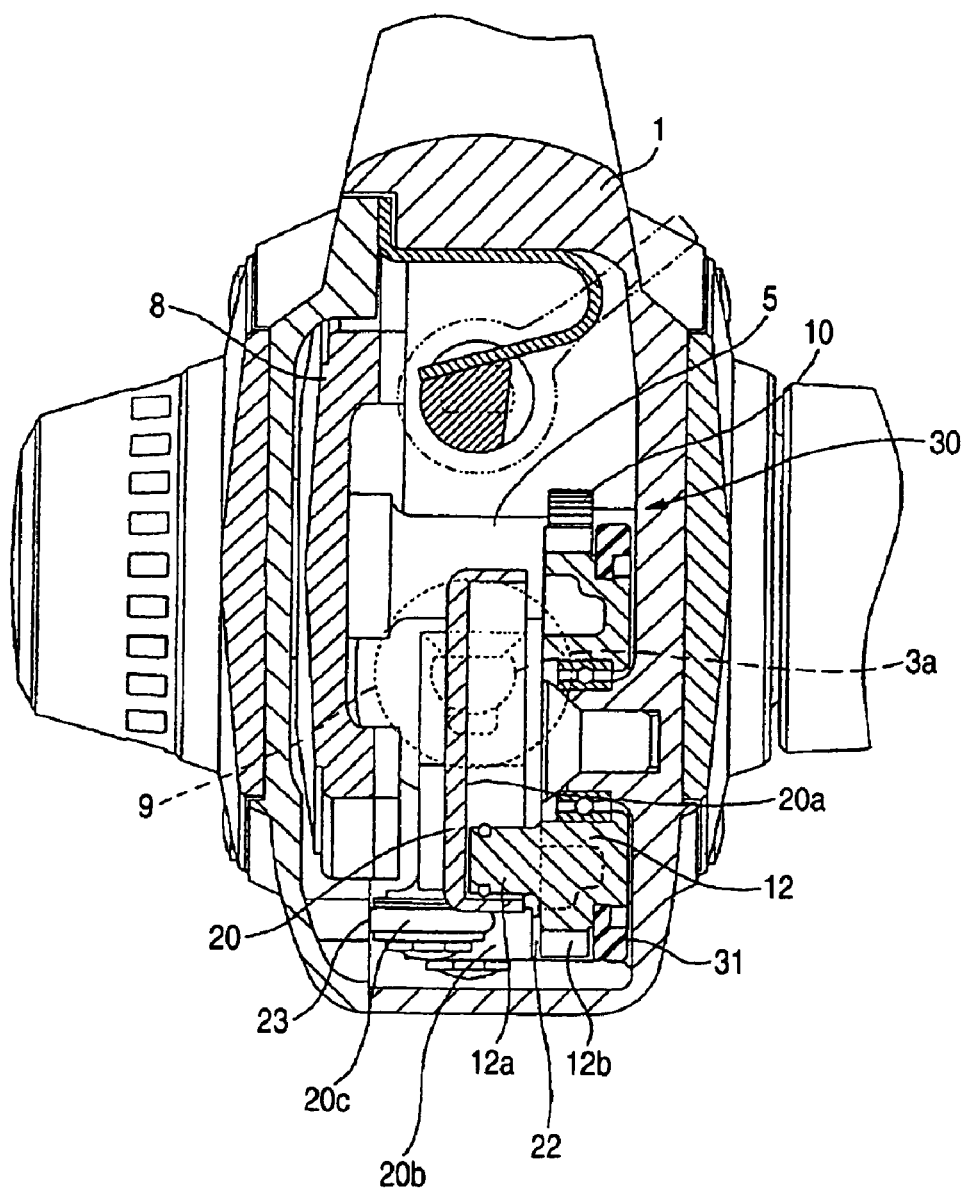
FIG. 4 is a cross sectional view along A—A line of FIG. 1.
Figure 5:
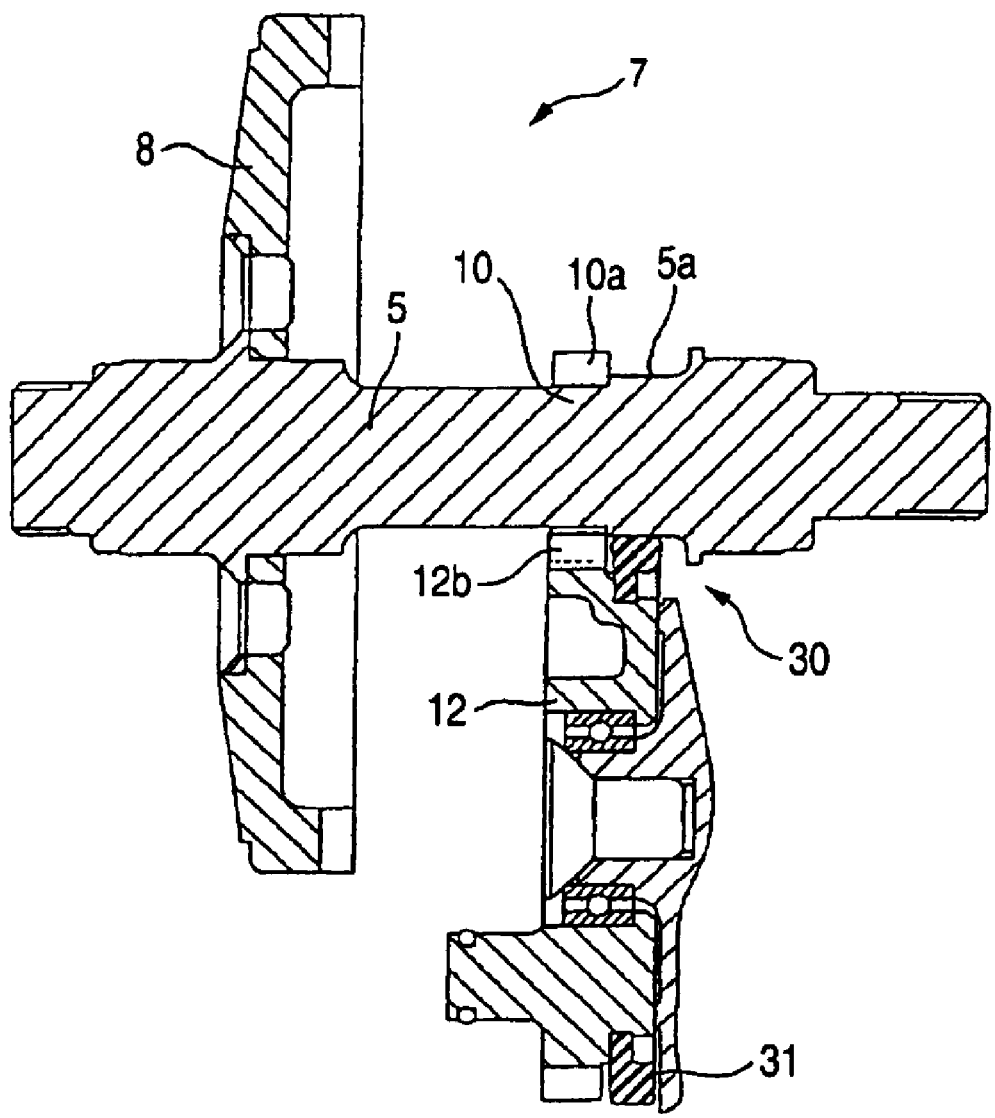
FIG. 5 is a view showing a structure of the driving force transmitting part.
Figure 6:
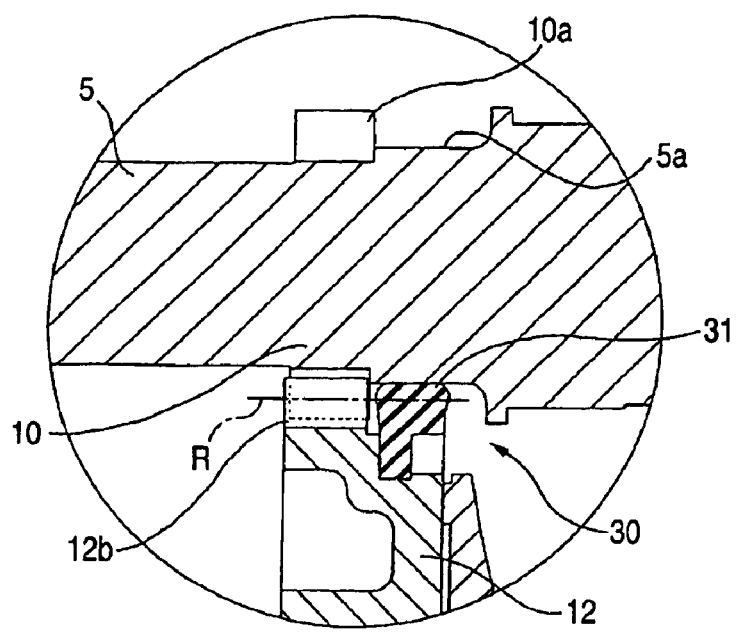
FIG. 6 is a view showing the main part of the driving force transmitting part.
Figure 7:
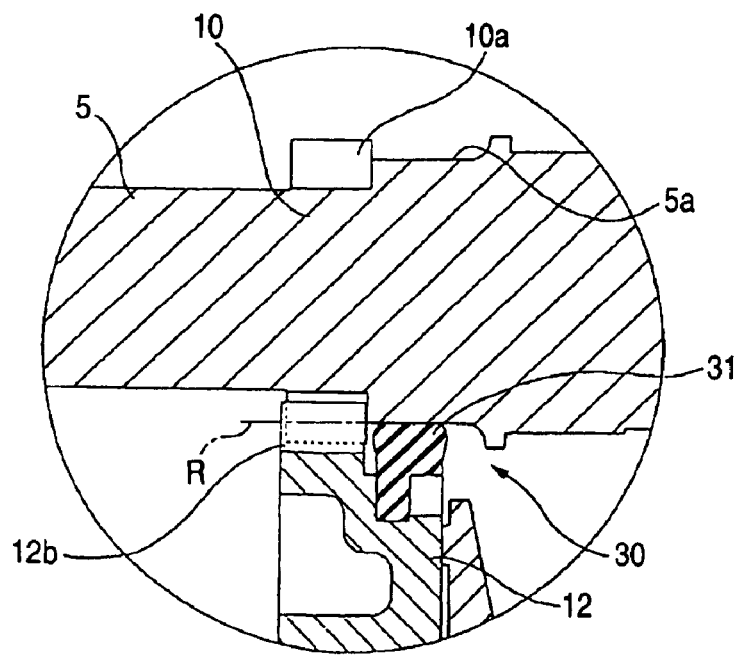
FIG. 7 is a view showing another structural example of the driving force transmitting part.
Figure 8:
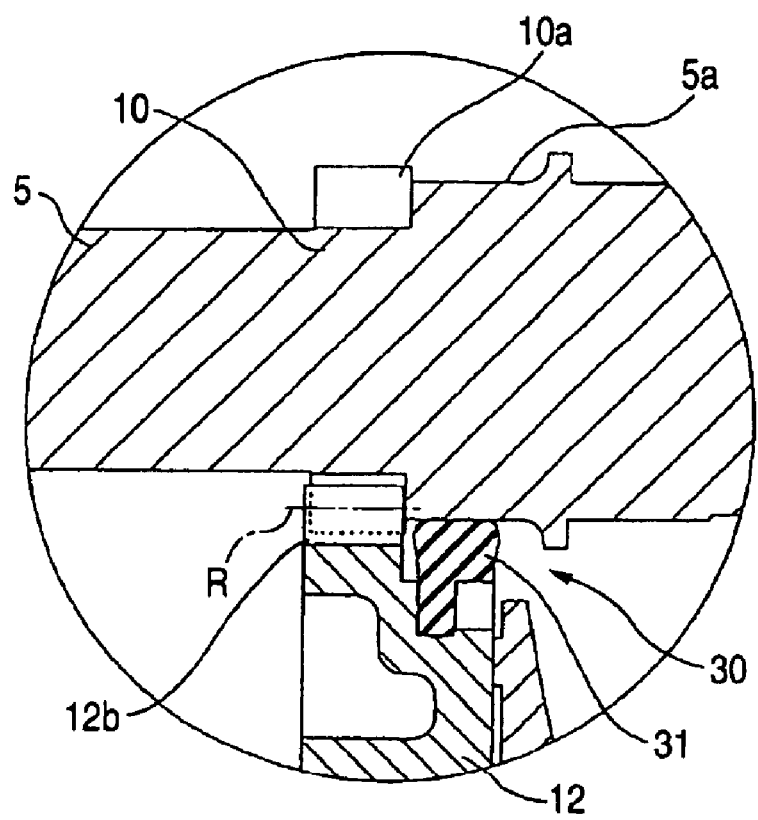
FIG. 8 is a view showing a further structural example of the driving force transmitting part.

FIGS. 1 to 8 are views showing a first embodiment according to the invention. FIG. 1 is a side view showing an internal structure of a spinning reel, FIG. 2 is an enlarged view of a main part, FIG. 3 is a view showing a structure of a driving force transmitting part between a driving shaft attached with a handle and a fishline parallel coiling device, FIG. 4 is a cross sectional view along A—A line of FIG. 1, FIG. 5 is a view showing a structure of the driving force transmitting part, FIG. 6 is a view showing a main part of the driving force transmitting part, and FIGS. 7 and 8 are views respectively showing other structural examples of driving force transmitting parts.

The reel main body 1 of the spinning reel is formed as one body with a reel foot 1a attached to a fishing rod, and is arranged with the rotor 2 rotatably supported at a front side of the body and a spool 3 capable of moving back and forth in synchronism with rotation of the rotor 2.

Within the reel main body 1, a handle shaft (a driving shaft) 5 is rotatably supported via a bearing, and is provided with the handle 6 at a projected end thereof. The handle shaft 5 is engaged with a power transmission mechanism 7 for transmitting the rotating operation of the handle 6 to rotating actuation of the rotor 2 and the back and forth movement of the spool. The power transmission mechanism 7 is mounted on the handle shaft 5 for rotating the rotor 2, and has a driving gear 8 (a face gear) defined with a gear portion as an inner gear and a pinion gear 9 which is in mesh with the driving gear 8, extends in a direction perpendicular to the handle shaft 5, and is defined in an interior with a cavity penetrating in an axial direction. Further, the power transmission mechanism 7 constitutes a part of an oscillating device (the fishline parallel coiling device) for driving the spool 3 back and forth, and has the driving gear 10 mounted on the handle shaft 5 (as shown in FIG. 5, it may be formed as one body) and an interlocking gear 12 rotatably supported to the reel main body.

The pinion gear 9 is rotatably supported within the reel main body via a pair of bearings, and in the cavity thereof, a spool shaft 3a is inserted movably in the axial direction, the spool shaft 3a extending in the direction perpendicular with the handle shaft 5, to which the spool 3 is attached at the front end. The pinion gear 9 is mounted with the rotor 2 at the front end, and is engaged with one-way clutch 13 at an intermediate part, so that if a lever 15 furnished outside of the reel main body 1 is rotated, the one-way clutch 13 is actuated, and the handle 6 is prevented from reverse rotation.

The rotor 2 is formed as one body with a pair of arms 2a so as to rotate around the spool 3. At respective front ends of the arms 2a, a bail supporting member 2c to which a base part of a bail 2b is attached is rotatably supported between a fishline coiling position and a fishline releasing position. One of the base parts of the bail 2b is attached to a fishline guiding part 2d integrally provided to the bail supporting member 2c.

The interlocking gear 12 is defined at its end with an eccentric projection 12a which is fitted within a guide groove 20a formed in a slider 20 screwed to the spool shaft 3a at its rear end. Consequently, if the interlocking gear 12 is rotated through the driving gear 10 by coiling the handle 6, the eccentric projection 12a is guided into the guide groove 20a while moving on a predetermined rotation locus, and reciprocates the spool shaft 3a (the spool 3) back and forth. The slider 20 is attached at the lower end with the bearing 20b and the elastic member 20c which are respectively engaged with guide parts 22, 23 defined within the reel main body for the slider 20 to stably reciprocate back and forth.

Rotating the handle 6 by use of the above mentioned structure, the rotor 2 is rotated via the power transmission mechanism 7 and at the same time the spool 3 is driven back and forth reciprocately, and the fishline is evenly wound on the spool 3 through a fishline guide part 2d. That is, rotating the handle 6, the rotor 2 is rotated via the driving gear 8 and pinion gear 9, while the spool 3 is driven back and forth reciprocately through the driving gear 10, the interlocking gear 12 and the slider 20.

At a driving force transmitting part actually effected with power transmission, the power transmission mechanism 7 has a rotating power transmitting instrument 30 by friction of the elastic member. Incidentally, as mentioned hereinafter, in the present embodiment, the rotating power transmitting instrument 30 is jointly provided to the driving force transmitting part by the above mentioned gears.

The interlocking gear 12 has a large thickness with respect to the driving gear 10. An elastic member 31 capable of elastic deformation such as a rubber having uniform thickness allover outer circumference is attached to the interlocking gear 12 so as to adjoin the gear 12b thereof. The elastic member 31 is pressed at prescribed pressure against a friction transmission rotating part 5a neighboring the driving gear 10 of the handle shaft 5, and owing to friction between both, the transmission of the driving force is available between the handle shaft 5 and the elastic member 31.

The elastic member 31 enables to exhibit different effects by forming the locus in the friction face to the friction transmission rotating part 5a to be identical (including also "approximately identical") or different with respect to a pitch diameter R of the gear 12b of the interlocking gear 12.

Specifically, as shown in FIGS. 5 and 7, if the elastic member 31 is formed such that the locus of the friction face to the friction transmission rotating part 5a is made equivalent (including also "approximately equivalent") to the pitch diameter R of the gear 12b of the interlocking gear 12, it is possible to eliminate difference in rotation between the power transmission by meshing the gears 10, 12 and the power transmission by the elastic member 31, and to transmit the rotating power at substantial equal speed. Therefore, under a condition of making the power transmission by the elastic member 31, it is preferable to set the gears 10, 12 not to contact both gear portions 10a, 12b (both gear portions are defined with a specific space (backlash) therebetween for effecting smooth rotation, and the gears 10, 12 are positioned not to contact each other).

With such a structure, under a low load, it is possible to drive the gears 10, 12 by the power transmission mechanism by friction of the elastic member 31 without contact between the gear portions 10a, 12b thereof, while under a high load, since the elastic member 31 may slip, it is possible to powerfully drive the gears through the power transmission by the mutual gears. As a result, durability of the gear may be improved, and concurrently insufficient driving force of the power transmission by friction may be obviated. Incidentally, under the high load condition, the elastic member 31 slides to generate force to always urge to push the gear faces of the gear portions 10a, 12b, thereby to remove vibration or bad rotation caused by errors in meshing the gears, and a gearing adjustment as the backlash adjustment is no longer needed.

Otherwise, as shown in FIGS. 6 and 8, if the elastic member 31 is formed such that the locus of the friction face to the friction transmission rotating part 5a is made different to the pitch diameter R of the gear 12b of the interlocking gear 12, (the structure of FIG. 6 has a large diameter, while the structure of FIG. 8 has a small diameter), the difference in rotation is generated between the power transmission by meshing the gears 10, 12 and the power transmission by the elastic member 31, and the power transmission by the friction of the elastic member 31 is effected with sliding, so that the power transmission by the gears is added with load (resistant force). Therefore, since the force is generated to always urge to press the gear faces of the gear portions 10a, 12b, thereby to remove vibration or bad rotation caused by errors in meshing the gears, and the gearing adjustment as the backlash adjustment is no longer needed.

According to the above backlash removing mechanism, it is possible to reduce the number of parts because of the simple structure in which the elastic member 31 should be merely attached so as to adjoin the gear portion 12b of the gear 12, and therefore any special setting-up work is not needed thereby realizing lower costs.

Second Embodiment

Figure 9:
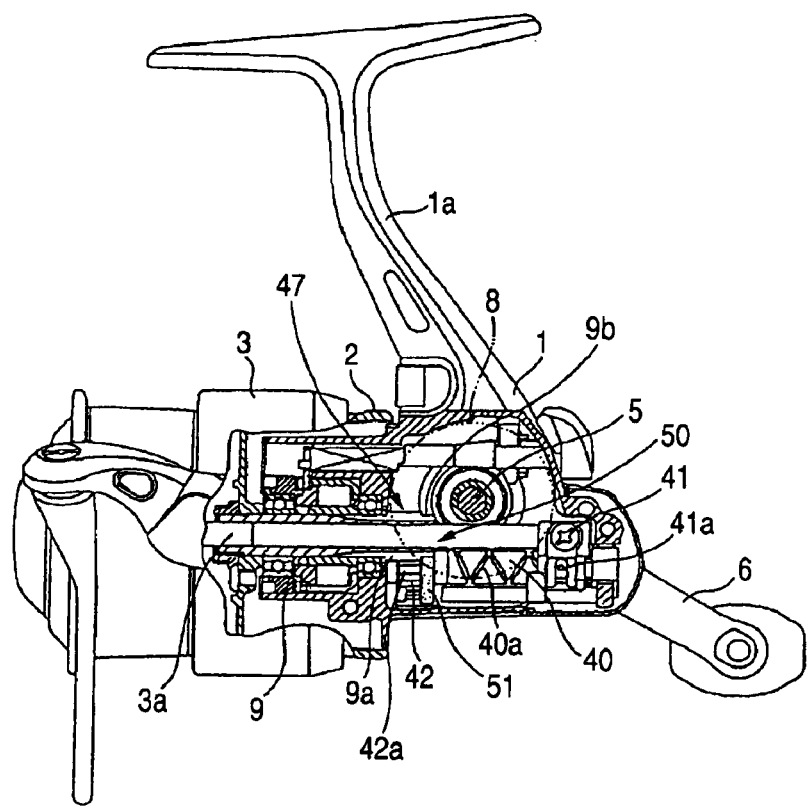
FIG. 9 is a view of a second embodiment of the invention, showing an interior structure of a spinning reel.
Figure 10:
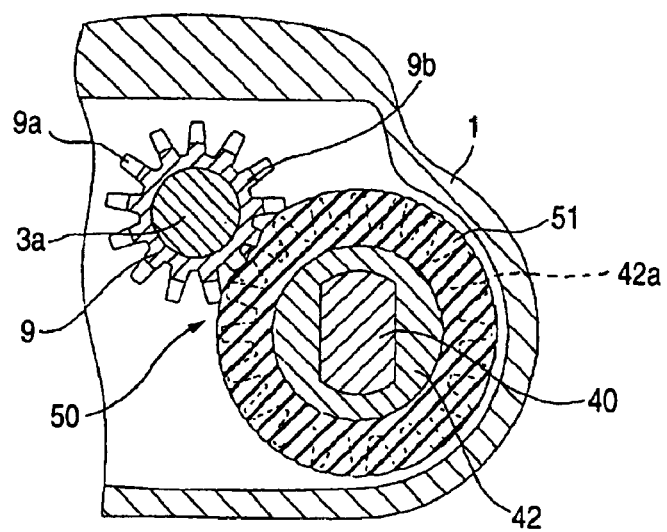
FIG. 10 is a view showing the structure of the driving forth between the pinion and the oscillating device.

FIGS. 9 and 10 are views showing a second embodiment of the invention, in which FIG. 9 is a side view showing an interior structure of the spinning reel, and FIG. 10 is a view showing a structure of the driving force transmitting part between the pinion and the oscillating device.

The oscillating device of this embodiment includes a worm shaft 40, a slider 41, and an oscillating gear 42, the worm shaft 40 being rotatably supported within the reel main body and extending in parallel with a spool shaft 3a, the slider 41 being screwed to the base end of a spool shaft 3a and having a pin 41a engaging a spiral groove 40a defined in the outer circumference of the worm shaft 40, and the oscillating gear 42 provided at an end of the worm shaft 40 and being in mesh with a pinion gear 9. If the worm shaft 40 is rotated via the pinion gear 9 and the oscillating gear 42, the engaging pin 41a is guided in the spiral groove 40a, and the spool shaft 3a is driven reciprocately back and forth.

In the power transmission mechanism 47 of the above oscillating device 47, the rotation power transmitting instrument 50 by the friction of the elastic member is furnished at the driving force transmitting part actually effected with power transmission, and also in the present embodiment, the rotating power transmitting instrument 50 is jointly provided to the above mentioned driving force transmitting parts (the pinion gear 9 and the oscillating gear 42) by the gears.

An elastic member 51 capable of elastic deformation such as a rubber of uniform thickness allover outer circumference is attached to the oscillating gear 42 so as to adjoin the gear part 42a. The elastic member 51 is pressed at prescribed pressure against the friction transmission rotating part 9b neighboring the gear 9a of the pinion 9, and owing to friction between both, the transmission of the driving force is available between the pinion gear 9 and the elastic member 51. The illustrated friction transmission rotating part 9b is formed in concave and convex in the circumferential direction so as to contact the elastic member 51 at fixed intervals, and the friction transmission rotating part 9b may be formed in the circumferential face. Also in this embodiment, the elastic member 51 may form the locus in the friction face to the friction transmission rotating part 9b to be identical (including also "approximately identical") or different with respect to a pitch diameter R of the gear part 42a of the oscillating gear 42.

According to such a structure, the same working effect as in the first embodiment may be exhibited.

The rotation power transmitting instrument by the friction of the elastic member may be arranged at various driving force transmitting parts in the power transmission mechanism provided within the spinning reel. Arranging the rotation power transmitting instrument at a plurality of parts, smooth driving conditions of low vibration are realized as a whole of the reel. Otherwise, the rotation power transmitting instrument by the friction of the elastic member maybe solely arranged, not jointly arranged to the rotation power transmitting instrument by meshing the mutual gears. Using the rotation power transmitting instrument by the friction of the elastic member instead of the rotation power transmitting instrument by meshing the mutual gears, it is possible to remove unpleasant vibrations by causing errors in meshing the mutual gears, the gearing adjustment as the backlash adjustment is no longer needed, capable of removing vibration or bad rotation caused by errors in meshing the gears.

Third Embodiment

Figure 11:
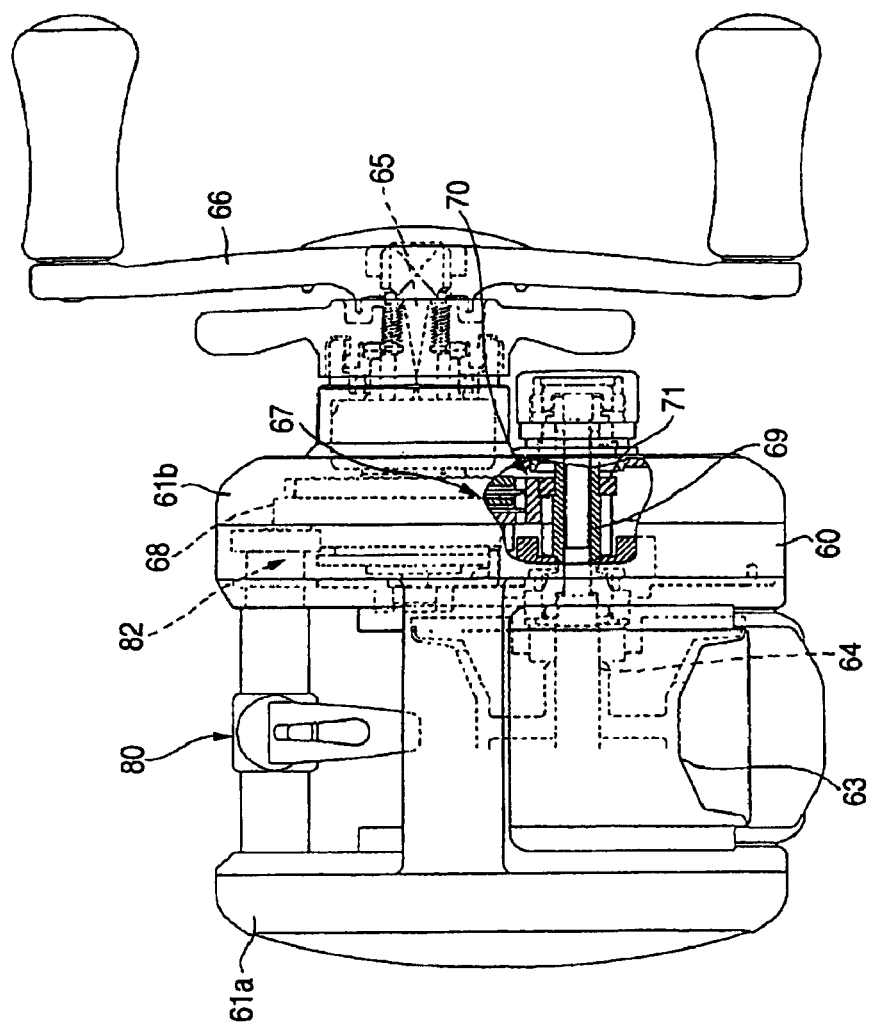
FIG. 11 is a view showing a third embodiment of the invention, showing a plan view of an interior structure of both bearing type reel.
Figure 12:
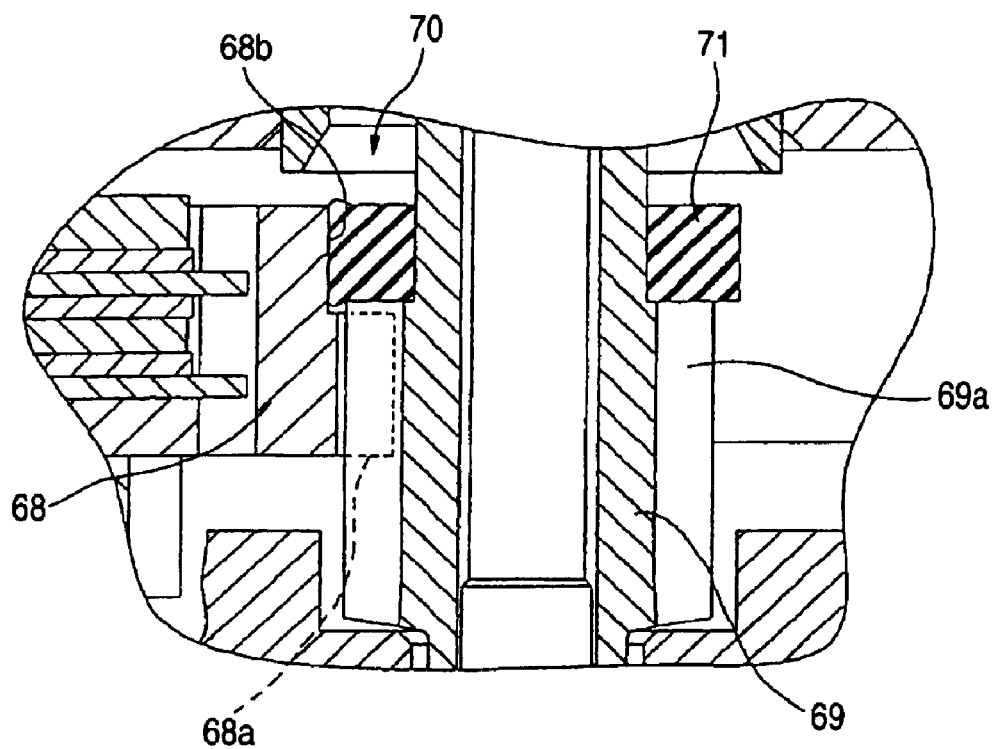
FIG. 12 is an enlarged view of the main part of both bearing type reel shown in FIG. 11.

FIGS. 11 and 12 are views showing a third embodiment of the invention, in which FIG. 11 is a plan view showing an interior structure of both bearing type reel, and FIG. 12 is an enlarged view of a main part of the same.

In a double-bearing type reel 60, a spool shaft 64 having the spool (the rotor) 63 on which the fish line is wound is rotatably supported via the bearing between left and right side plates 61a, 61b. The spool 63 is rotated through the power transmission mechanism 67 by rotating the handle 66 furnished at the end of the handle shaft 65 projecting from the right side plate 61a.

The power transmission mechanism 67 is detachably engaged with the driving gear 68 attached to the handle shaft 65 and with the spool shaft 64 in mesh with the driving gear 68, and has the pinion gear 69 rotatably supported within the right side plate through the bearing.

As the above mentioned embodiment, in the power transmission mechanism 67, the rotation power transmitting instrument 70 by the friction of the elastic member is furnished at the driving force transmitting part effected with power transmission, and also in the current embodiment, the rotating power transmitting instrument 70 is jointly provided to the above mentioned driving force transmitting parts (the pinion gear 68 and the oscillating gear 69) by the gears.

An elastic member 71 capable of elastic deformation such as a rubber of uniform thickness allover outer circumference is attached to the pinion gear 69 so as to adjoin the gear part 69a. The elastic member 71 is pressed at prescribed pressure against the friction transmission rotating part 69b of the circumferential face neighboring the gear 68a of the driving gear 68, and owing to friction between both, the transmission of the driving force is available between the driving gear 68 and the elastic member 71. Also in this embodiment, the elastic member 71 may form the locus in the friction face to the friction transmission rotating part 68b to be identical (including also "approximately identical") or different with respect to the pitch diameter R of the gear part 42a of the oscillating gear 42.

Also double-bearing type reel is capable of having the rotation power transmitting instrument by the friction of the elastic member at the driving force transmitting part in the driving force transmitting mechanism for providing the same working effect as in the spinning reel. Also in the current embodiment, the rotating power transmission by the friction of the elastic member can be arranged at various parts. For example, it is sufficient to arrange at a part of the driving force transmitting part 82 driving the fishline coiling device 80 furnished between the front left and right side plates 61a, 61b at the front of the spool 63.

Explanation has been made to the embodiments of the invention, and the invention is applicable to various kinds of fishing reels and may be disposed at positions effected with the driving force transmission.

In accordance with the invention, it is possible to offer a fishing reel having a power transmission mechanism enabling to remove the backlash in the gear row with the simple structure.

What is claimed is:

1. A fishing reel comprising:

a reel body;

a handle rotatably supported by the reel body;

a rotor rotatably supported by the reel body;

a power transmitting mechanism including a driving force transmitting part for transmitting driving force generated by rotating the handle to drive the rotor; and a first rotation power transmitting instrument including an elastic member for frictionally transmitting the driving force provided at the drive force transmitting part, wherein the first rotation power transmitting instrument includes two interlocking gears, and said elastic member is attached to a gear portion of one of said two interlocking gears so as to prevent said interlocking gears from contacting under a low load condition wherein said elastic member is disposed adjacent to said gear portion without being disposed within a tooth portion of said gear portion.

2. The fishing reel according to claim 1, wherein the driving force transmitting part includes the first rotation power transmitting instrument and a second rotation power transmitting instrument including gears for transmitting the driving force.

3. A fishing reel comprising:

a first shaft;

a first gear provided at the first shaft;

a friction transmission rotating part coaxial with the first gear and provided at the first shaft;

a second shaft;

a second gear in mesh with the first gear provided at the second shaft; and an elastic member coaxial with the second gear and provided at the second shaft, wherein the elastic member elastically contacts with the friction transmission rotating part, and driving force is transmitted between the first and second shafts via the first and second gear and via the friction transmission rotation part and the elastic member, and wherein said elastic member is an annular ring shape.

4. The fishing reel according to claim 3 further comprising:

a handle for generating the driving force; and a rotor which is rotated by the driving force, wherein the first and second shafts are interposed between the handle and the rotor for transmitting the driving force.

5. The fishing reel according to claim 3, wherein said elastic member is attached to one of said first and second gears so as to prevent said first and second gears from contacting under a low load condition.

* * * * *